United States Patent
Scheerer et al.

(10) Patent No.: US 6,746,322 B2
(45) Date of Patent: Jun. 8, 2004

(54) CABIN PRESSURE CONTROL SYSTEM, METHOD OF CONTROLLING THE ACTUAL PRESSURE INSIDE A CABIN AND OUTFLOW VALVE

(75) Inventors: Friedrich-Joachim Scheerer, Liederbach (DE); Thomas Willenbrink, Langenselbold (DE)

(73) Assignee: Nord-Micro AG & Co. oHG, Frankfurt/Main (DE)

( * ) Notice: Subject to any disclaimer, the term of this patent is extended or adjusted under 35 U.S.C. 154(b) by 0 days.

(21) Appl. No.: 10/182,084

(22) PCT Filed: Nov. 27, 2001

(86) PCT No.: PCT/EP01/13849

§ 371 (c)(1), (2), (4) Date: Jul. 25, 2002

(87) PCT Pub. No.: WO02/44023

PCT Pub. Date: Jun. 6, 2002

(65) Prior Publication Data

US 2002/0193063 A1 Dec. 19, 2002

(51) Int. Cl.[7] .................... B64D 13/04
(52) U.S. Cl. ........................ 454/74
(58) Field of Search .................. 454/71, 72, 73, 454/74; 244/118.5, 129.1

(56) References Cited

U.S. PATENT DOCUMENTS

| | | | | |
|---|---|---|---|---|
| 2,450,881 A | * | 10/1948 | Cooper et al. ............ | 454/73 |
| 2,513,332 A | * | 7/1950 | Kemper .................. | 454/73 |
| 2,539,430 A | * | 1/1951 | Jepson et al. ............ | 454/74 |
| 2,725,007 A | * | 11/1955 | Sevin .................... | 454/73 |
| RE24,990 E | * | 5/1961 | Del Mar ................. | 454/74 |
| 3,376,803 A | * | 4/1968 | Emmons ................. | 454/74 |
| 3,473,460 A | * | 10/1969 | Emmons ................. | 454/74 |
| 4,164,899 A | * | 8/1979 | Burgess ................. | 454/72 |
| 4,164,900 A | * | 8/1979 | Aldrich ................. | 454/72 |
| 4,553,474 A | * | 11/1985 | Wong et al. ............. | 454/74 |
| 5,273,486 A | * | 12/1993 | Emmons et al. .......... | 454/74 |
| 5,520,578 A | * | 5/1996 | Bloch et al. ............ | 454/74 |
| 5,737,529 A | * | 4/1998 | Dolin et al. ............ | 709/245 |
| 5,934,614 A | * | 8/1999 | Mueller et al. .......... | 244/118.5 |
| 6,519,516 B2 | * | 2/2003 | Pfaeffle et al. .......... | 701/35 |

* cited by examiner

Primary Examiner—Harold Joyce
(74) Attorney, Agent, or Firm—Stephen B. Salai; Brian B. Shaw; Harter, Secrest & Emery, LLP

(57) ABSTRACT

The invention relates to a cabin pressure control system (10), a method of controlling the actual pressure inside a cabin (50) and an outflow valve (14; 15; 16; 17), especially for use in said system (10) or said method. The invention provides communication of actual cabin pressure to the outflow valve (14; 15; 16; 17) and additionally a common data exchange line (22) connecting the components of the cabin pressure control system (10). The system (10) is highly redundant and reliable, guarantees the desired sophisticated pressure control even if one or several components fail and allows complete elimination of the previously used fully pneumatic safety valves.

19 Claims, 5 Drawing Sheets

CABIN PRESSURE CONTROL SYSTEM, METHOD OF CONTROLLING THE ACTUAL PRESSURE INSIDE A CABIN AND OUTFLOW VALVE

The present invention relates to a cabin pressure control system, especially for use in an aircraft, comprising at least one pressure sensor for measuring actual pressure inside a cabin, at least one outflow valve for controlling a pressure differential between said actual pressure and the pressure of an atmosphere surrounding said cabin, at least one controller for calculating a drive signal to be communicated to said at least one outflow valve based on the actual pressure and the atmosphere pressure or the pressure differential.

Additionally, the present invention relates to a method of controlling the actual pressure inside a cabin, especially in an aircraft cabin, comprising the steps of measuring the actual pressure inside said cabin, measuring the pressure in a surrounding atmosphere, calculating a pressure differential between said actual pressure and said atmosphere pressure, or, as alternative, measuring a pressure differential between said actual pressure and an atmosphere pressure, and communicating an actual pressure signal and an atmosphere pressure signal and/or a pressure differential signal to at least one controller for calculating a drive signal for at least one outflow valve for controlling the pressure differential between said actual pressure and said atmosphere pressure.

In yet another aspect, the present invention is directed to an outflow valve for controlling a pressure differential between actual pressure in a cabin and a surrounding atmosphere being provided with an input for receiving a drive signal from a controller and at least one drive, said outflow valve being suitable for use in a cabin pressure control system or a method as set forth above.

The pressure differential between the actual cabin pressure and atmosphere pressure may be calculated by measuring both pressures and subtracting them from each other. Alternatively, said pressure differential may be measured directly by a suitable sensor. It is of course possible to use information from other aircraft systems, too. The pressure differential is referred to as positive if cabin pressure is higher than atmosphere pressure and as negative if otherwise.

A controller, a cabin pressure control system and a method of controlling the actual pressure inside a cabin are known from EP 0 625 463 B1, issued to the applicant of the present application. Said prior art document discloses a cabin pressure control system comprising a controller, one outflow valve and two safety valves. The controller calculates an output signal based on the pressure differential between the cabin and the atmosphere and additional critical parameters like final cruise flight level. The outflow valve is actuated in order to keep the actual cabin pressure near a predetermined control cabin pressure. The known system provides a closed loop control.

The system must fulfill two requirements. First, the pressure differential must not exceed a certain threshold because otherwise the aircraft fuselage may be damaged or destroyed. Second, the operator usually sets a certain pressure rate of change which must be maintained. Huge change rates in cabin pressure are harmful for the crew and the passengers and therefore not acceptable.

In case of malfunction of the outflow valve or the controller, the pressure differential between the cabin pressure and the atmosphere pressure may exceed a predetermined threshold. In case of a positive pressure differential the safety valves open mechanically based on said pressure differential. Said opening prevents damage or destruction of the cabin due to the pressure differential. In order to compensate a negative pressure differential, the known system additionally provides a negative relief valve allowing entry of air in the cabin.

The known cabin pressure control system is reliable. However, it requires the use of one outflow valve and two safety valves to prevent overpressure, leading to an increased weight which is most undesirable in aircrafts. In the prior art cabin pressure control system two independent overpressure relief valves are required by aviation regulations.

Usually, prior art pressure control systems operate two control channels with one additional manual lane. In case of failures the systems stepwise degrades to simplex and to the manual back-up. The required autonomous safety functions are implemented in the safety valves.

New requirements for enhanced safety of the unique systems, especially stipulated by FAR amendments will no longer accept this prior art cabin pressure control systems. The redundancy level must be increased. Moreover, the operators of aircrafts have demanded a higher dispatchability of control systems which has affected the system architecture in terms of the probability for the need to replacing defective components.

It is therefore an object of the present invention to provide a cabin pressure control system, a method of controlling cabin pressure and an outflow valve allowing effective pressure control and preventing undue high cabin pressure with reduced weight and increased redundancy. It is a further object of the present invention to maintain the highly sophisticated cabin pressure control even if one or several components of the cabin pressure control system fail.

To achieve said objects, the invention proposes in a first embodiment a cabin pressure control system of the above mentioned kind which is characterized in that said at least one outflow valve is connected to said at least one controller and said at least one pressure sensor in order to receive both the drive signal from said at least one controller and an actual pressure signal from said at least one pressure sensor. To advantage, said cabin pressure control system comprises several controllers, several sensors for cabin pressure and several outflow valves which are connected to each other. All controllers, sensors and outflow valves can then exchange signals by means of a common data exchange line.

In a second embodiment, the above mentioned objects are achieved by a cabin pressure control system as set forth above which is characterized in that said at least one pressure sensor, said at least one outflow valve and said at least one controller are connected to each other by a common data exchange line in order to exchange signals with each other.

In a preferred embodiment, the cabin pressure control system comprises at least one additional sensor for measuring atmosphere pressure. Said sensor may be configured as integral part of the cabin pressure control system and connected to the common data exchange line. As alternative, the sensor for measuring atmosphere pressure may be connected to the at least one controller. In that case, the sensor may be part of a different avionic system, e.g. a system for determining flight parameters.

The data exchange line may be configured as duplex bus system and preferably features a triple redundancy. It may be connected to a control board for information output and instruction input by an operator.

All major functions of the new cabin pressure control system are preferably triplex. They may be connected to each other with the triple redundant full duplex bus system. Said system is preferably time synchronized. Data synchronization and symmetrization is performed between each of the components connected to the bus.

Contrarily to the prior art systems there is no longer a channel in control directing the associated drives for said channel of all outflow valves. Contrarily, the invention provides pressure control which will be performed by those components which are selected from an arbitration logic. The components in charge may vary in each major time frame of the real time control function.

In case of failure in one function there is no system degradation like the loss of one channel in prior art systems. Only said function is faulty or suspected to be inaccurate. It may be replaced by another component effecting the same function. If the failure can be recovered, the defective component will come back to operation based on the results of a built-in test logic.

The invention still provides a manual mode of operation which will be implemented as a function running on the already existing control system resources. There is no need to allocate extra system resources for the manual mode function. The components and the bus need not to be modified.

Introduction of the bus allows for high flexibility of the cabin pressure control system. Defective components are disconnected from the bus and may be easily replaced. Additional components may be added without sophisticated changes in system architecture.

The method in accordance with the invention is characterized by the fact that said actual pressure signal additionally is communicated to said at least one outflow valve for controlling the pressure differential between said actual pressure and said atmosphere pressure in order to keep said pressure differential between a predetermined upper and a predetermined lower level. Additionally, the atmosphere pressure signal may be communicated to said at least one outflow valve. To advantage, there are again provided several controllers, pressure sensors and outflow valves which are exchanging information by means of a common data exchange line. Each controller may calculate his own drive signal. The drive signal of all controllers are then compared to each other in order to determine any inaccurate calculations. Additionally, the outflow valves receive pressure information and may check accuracy of the drive signals received by the controllers.

In a preferred embodiment the positions of drive units of each outflow valve are monitored and communicated to other outflow valves and/or the controllers. Malfunction of a drive unit may be determined on data exchange between the ourflow valves without involving the controllers. Any inaccurate positions can be readily determined. The power supply to an outflow valve with an inaccurate drive unit position may be switched off. Preferably, the outflow valves exchange information regarding the positions of their drive units by means of the common data exchange line. As alternative, there may be provided a separate data exchange channel.

The positions of the drive units of all outflow valves are controlled by the controller which is currently in charge. Said controller may communicate with the other controllers, the sensors and the outflow valves. The system may automatically change the controller which is in charge.

If the controller in charge issues an incorrect drive signal, said inaccuracy is recognized. Control and calculation of the drive signal is transferred to another controller. There will be no system degradation.

The outflow valve in accordance with the invention is characterized by the fact that it additionally comprises an input for receiving the actual pressure signal and at least one logic unit for actuating its drive unit. Contrarily to the prior art outflow valves, the invention provides an outflow valve with its own logic unit. Said logic unit is preferably less complex than the controller logic units. It provides a safety backup in case all controllers fail and constantly monitors the drive signals received from the controller in charge. To that end, the outflow valve is provided with an input for receiving the actual pressure signal.

To further enhance the redundancy the outflow valve preferably comprises a further input for an atmosphere pressure signal and/or a differential pressure signal. It may additionally or as alternative be provided with an input-output for connection to a common data exchange line. All relevant information may be communicated to each outflow valve. The logic units receive all required information for actuating their associated drive units. Said actuation signal and the drive unit position are constantly monitored and compared with drive signals of the controller.

The outflow valve may to advantage comprised two drive units. There may be provided a single logic unit for actuating all drive units. As alternative, each drive unit may be provided with its own logic unit. In the latter case, the logic units of each outflow valve communicate with each other. Communication may be effected by means of the common data exchange line or by a direct data exchange channel between the logic units inside the outflow valve.

The invention will now be detailed by way of example embodiments shown in the drawings, in which:

FIG. 1 shows a prior art cabin pressure control system;

FIG. 2 schematically shows a cabin pressure control system in accordance with the invention;

FIG. 3 schematically shows data exchange of the cabin pressure control system in accordance with the invention;

Figure 6:
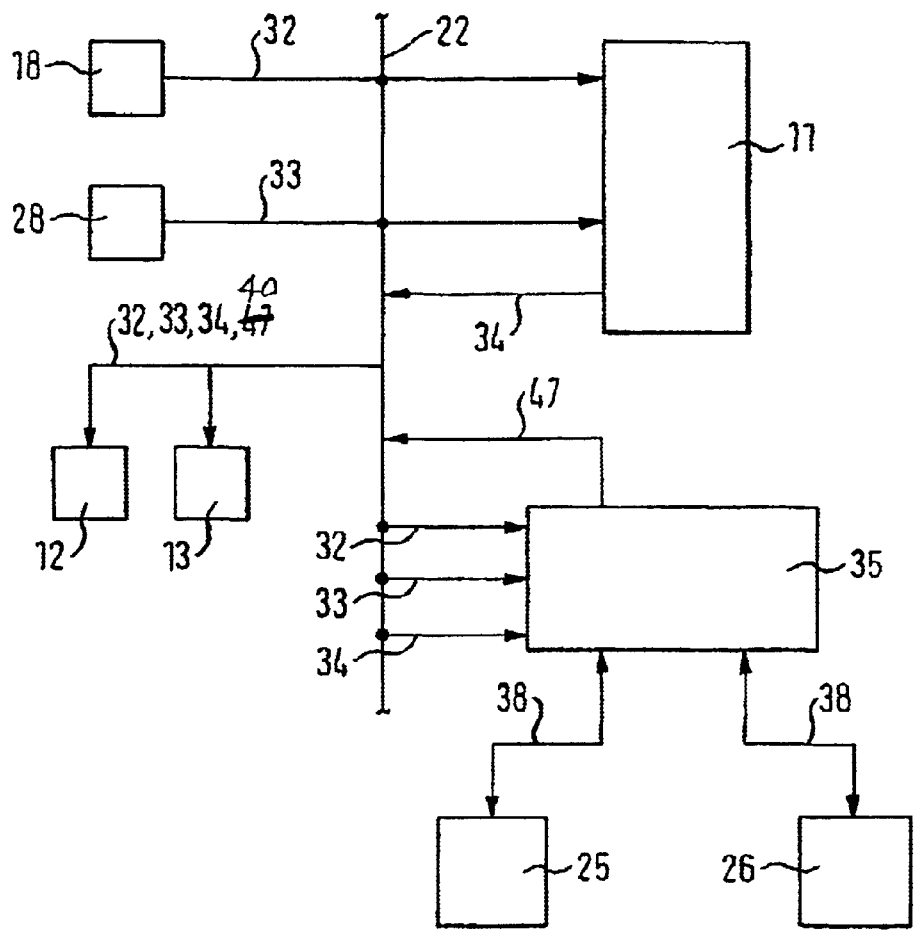
Figure 7:
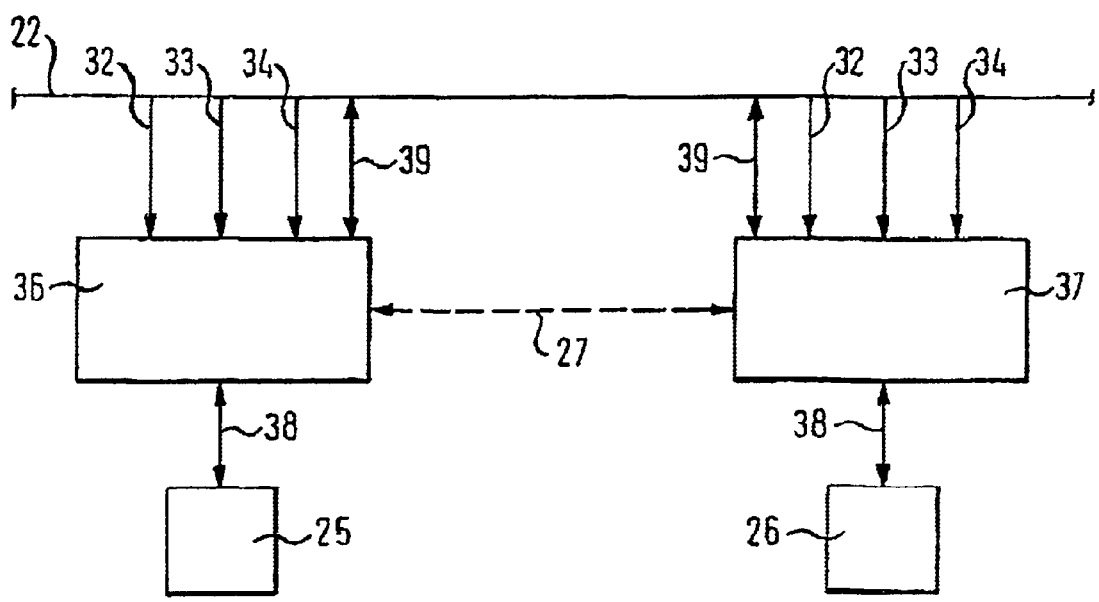

FIG. 6 schematically shows communication and signal processing according to a first embodiment of the invention; and FIG. 7 schematically shows communication and signal processing according to a second embodiment of the invention.

DETAILED DESCRIPTION OF THE INVENTION

Figure 1:
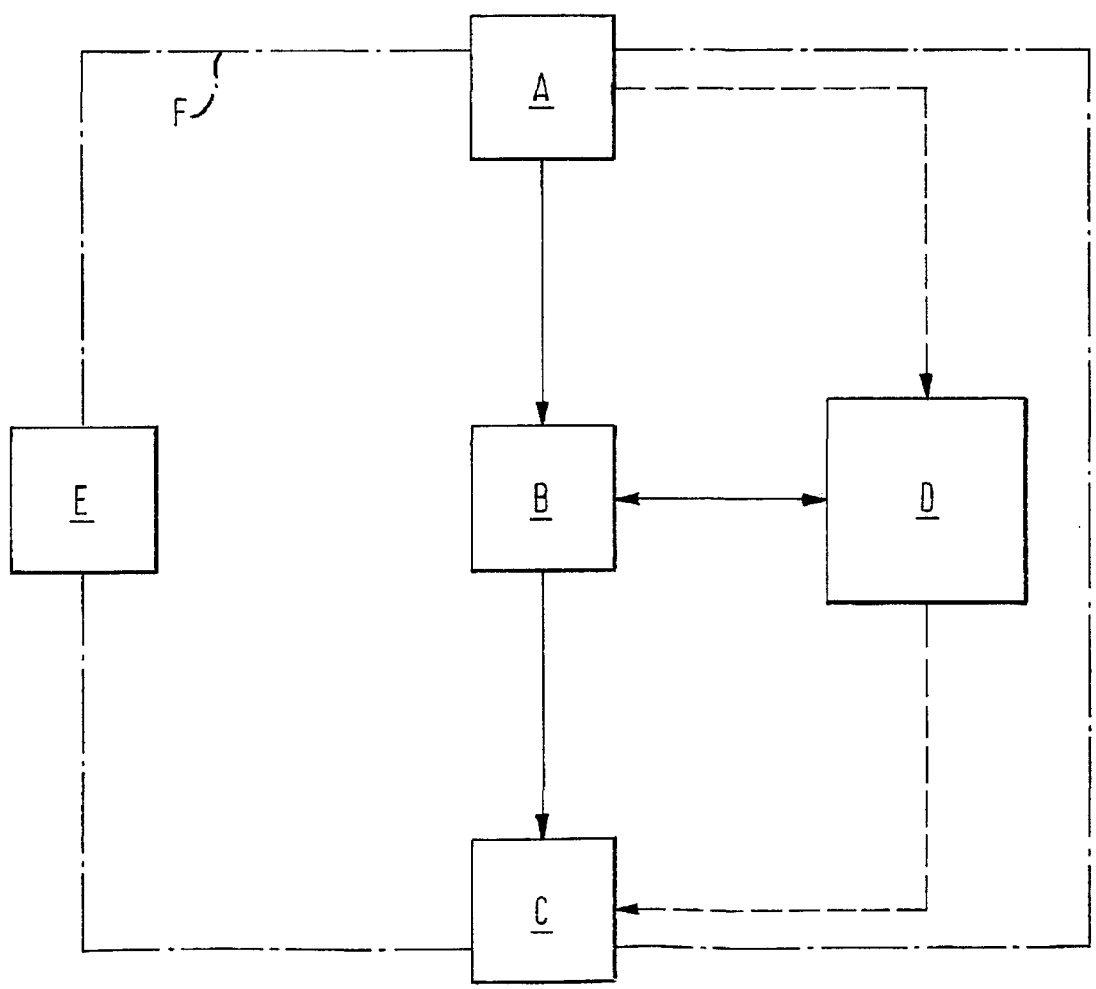

FIG. 1 shows a prior art cabin pressure control system comprising a sensor A, controller B, an outflow valve C and a display D. In case of failure of sensor A, controller B and/or outflow valve C the differential pressure is maintained between a predetermined upper and lower level by means of a fully pneumatic separate safety valve E. The cabin is schematically shown as F.

The pressure differential is controlled by measuring both the actual pressure inside the cabin F and the pressure of an atmosphere surrounding said cabin F. The values are processed in controller B and communicated to outflow valve C. There is no direct connection between the sensor A and the outflow valve C. The signals of sensor A and the calculation results of controller B may be displayed on display D. Additionally, the display D provides a manual operation mode which may directly affect the outflow valve C.

In case of failure of the controller B the prior art system can no longer maintain the sophisticated cabin pressure mechanisms and is reduced to simplex. The safety valve E is heavy, bulky and increases the system weight and costs. Although there may be provided several controllers B in a prior art system, information is always exchanged along defined channels. There is no free communication between the components of the system.

Figure 2:
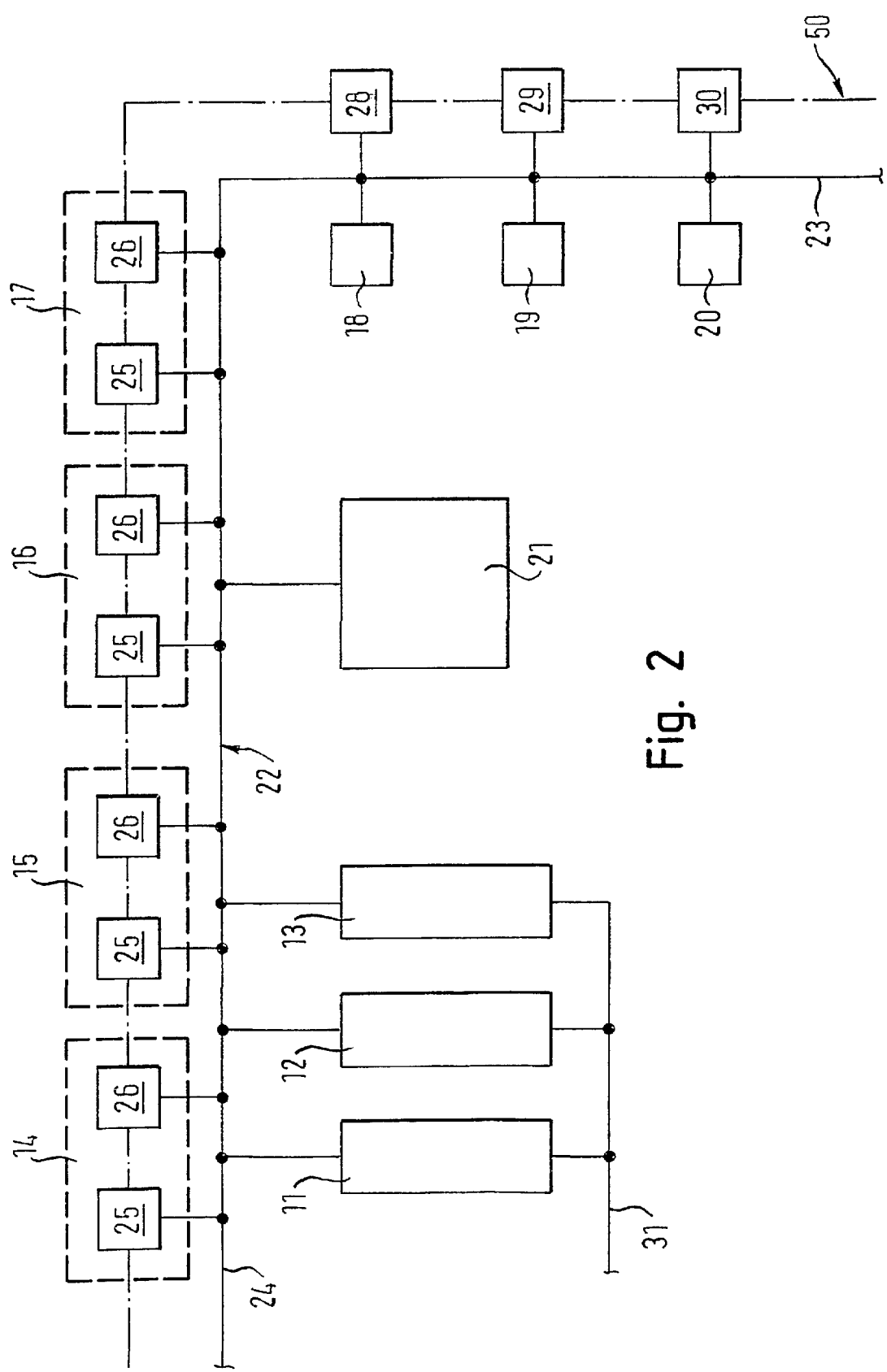
Figure 3:
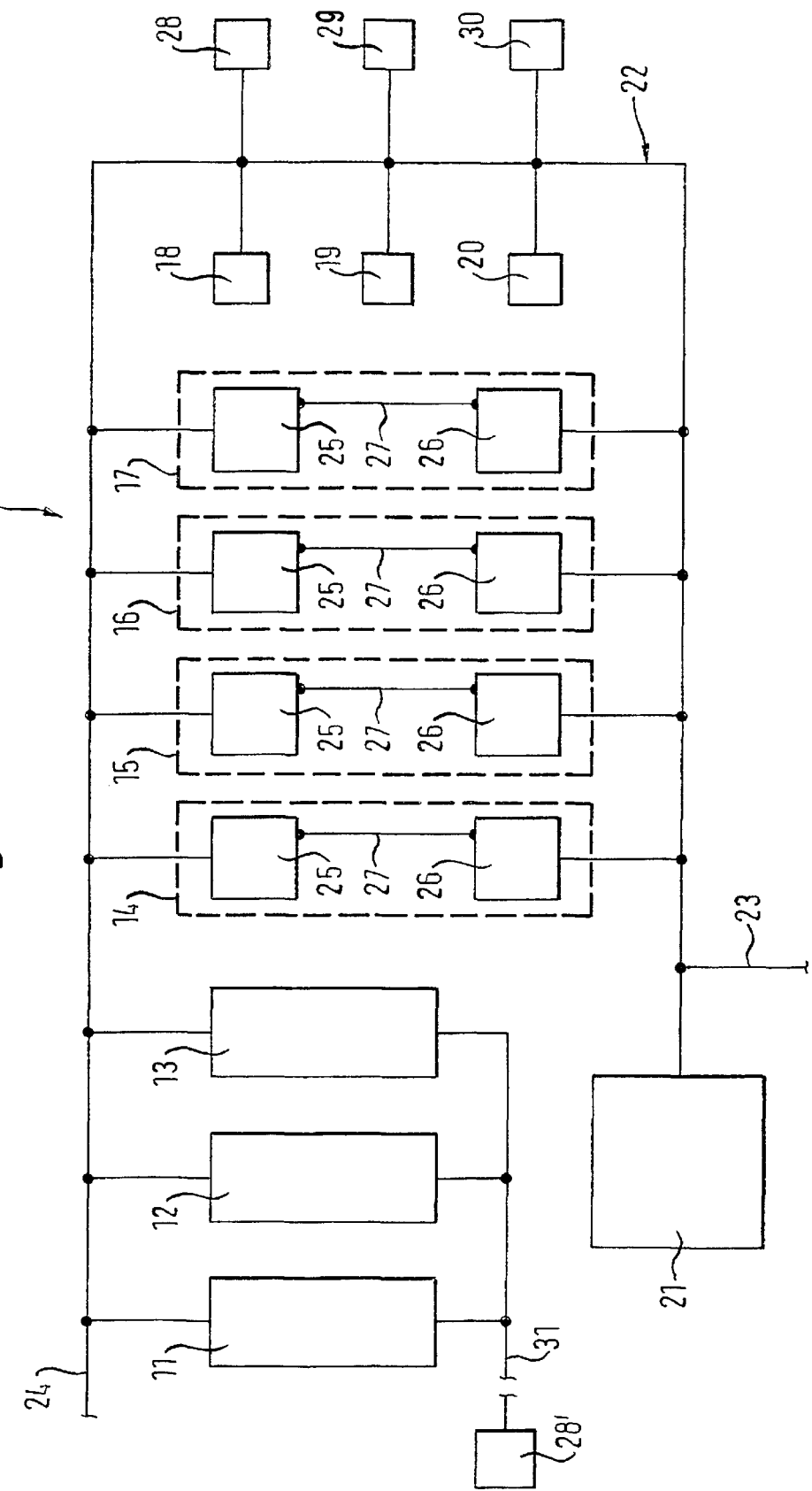

FIGS. 2 and 3 schematically show a cabin pressure control system 10 in accordance with the invention and data exchange between the system components. Said system 10 comprises three controllers 11, 12, 13 for outflow valves 14, 15, 16, 17 and three sensors 18, 19, 20 for measuring actual cabin pressure. Said components are connected by means of a full duplex triple redundant bus 22 for data exchange. The bus 22 is connected to a control 21 for information display and instruction input by an operator. It is additionally provided with connections 23, 24 for communication with other avionic systems. The cabin is schematically shown as 50.

Each outflow valve 14, 15, 16, 17 comprises two drive units 25, 26 capable of communicating with each other by means of a channel 27. Each drive unit 25,26 is connected to the bus 22.

In the embodiment shown in FIGS. 2 and 3 the cabin pressure control system 10 additionally comprises three sensors 28, 29, 30 for measuring atmosphere pressure which are directly connected to the bus 22. Additionally or as alternative atmosphere pressure may be measured by a sensor 28' the output signals of which are communicated to the controllers 11, 12, 13 by a connection 31. The sensor 28' may be part of a system for determining flight parameters such as total pressure, atmosphere pressure and angle of attack.

The bus 22 allows full communication of all shown components with each other. The controllers 11, 12, 13, the outflow valves 14, 15, 16, 17 and their drive units 25, 26 and the sensors 18, 19, 20 as well as sensors 28, 29, 30 can readily exchange information. An arbitration logic determines which controller 11, 12, 13 is in charge. It is additionally determined which sensor 18, 19, 20 and 28, 29, 30, respectively, will be used for calculation. Each controller 11, 12, 13 can communicate with each drive unit 25, 26. Information exchange between the drive units 25, 26 is affected via the bus 22 or the channel 27. Additionally, the outflow valves 14, 15, 16, 17 communicate with each other and monitor the position of their respective drive units 25, 26. Any inaccurate drive unit position will be related to all outflow valves 14, 15, 16, 17 and to the controllers 11, 12, 13 as well as to control 21. The power supply to a drive unit 25, 26 with an inaccurate position will be switched off.

New components may easily added to the bus 22. Defective components of the cabin pressure control system 10 can readily be disconnected and replaced. If one controller 11, 12, 13 or one of the sensors 18, 19, 20, 28, 29, 30 fails or is suspected to be faulty, the required calculations in order to maintain the pre-set pressure differential are transferred to any of the remaining controllers 11, 12, 13. Accordingly, there is a high level of redundancy.

Figure 4:
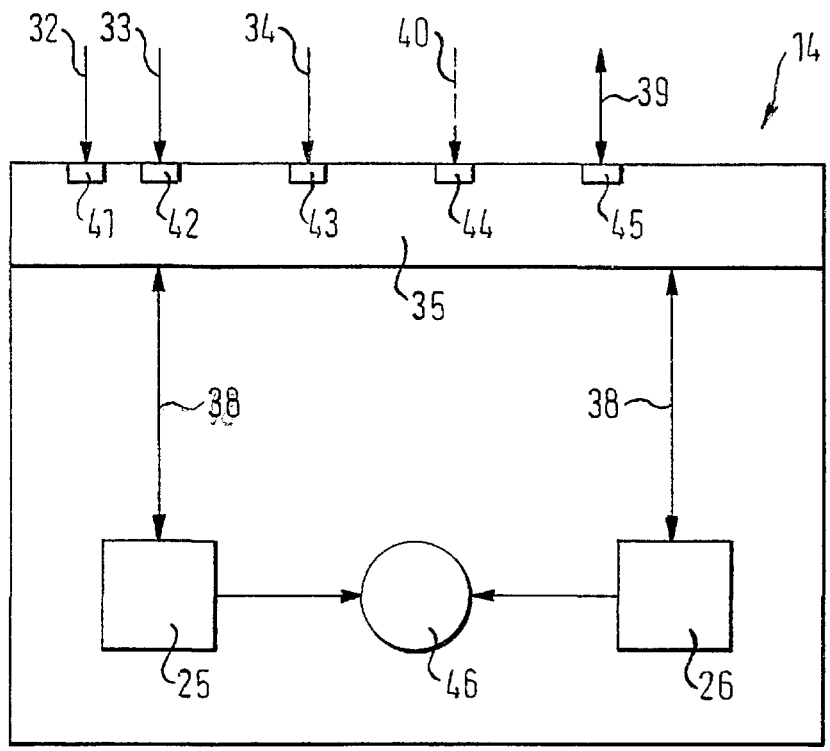
FIG. 4 shows a schematic illustration of a first embodiment of an outflow valve.
Figure 5:
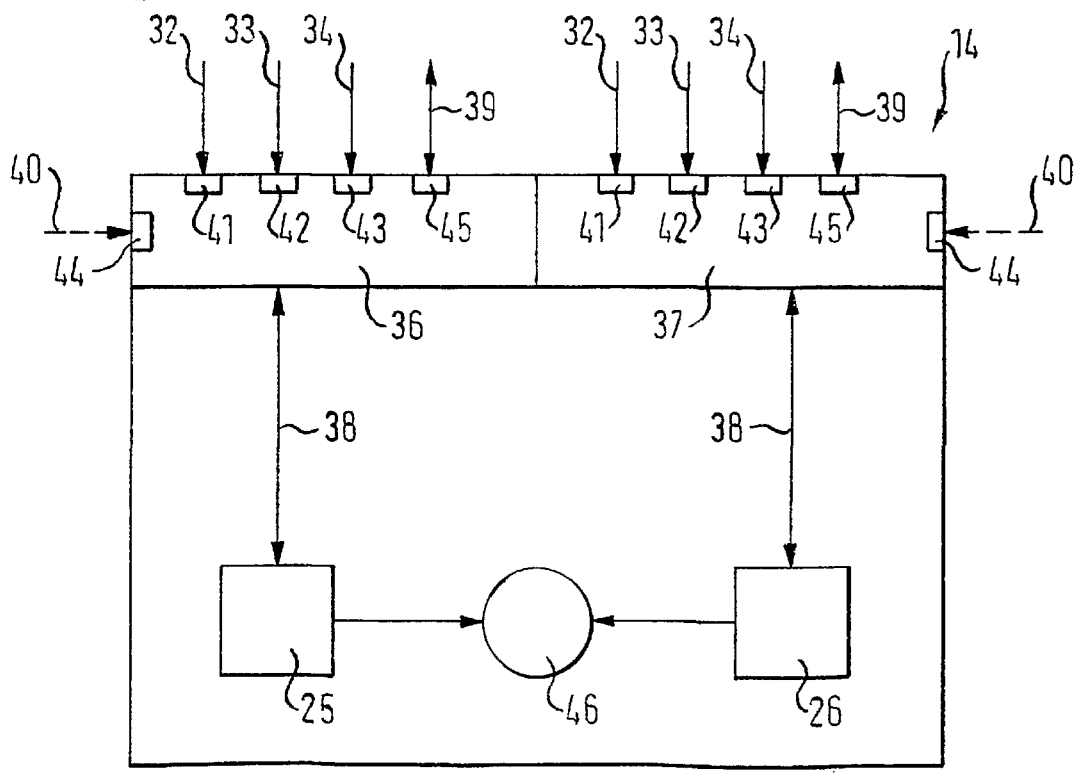
FIG. 5 shows a schematic illustration of a second embodiment of an outflow valve.

FIGS. 4 and 5 show two different embodiments of an outflow valve 14. The other outflow valves 15, 16, 17 feature the same construction. In both embodiments, the outflow valve 14 is provided with an input 41 for receiving an actual pressure signal 32 relating the actual cabin pressure. Additionally, there is a provided an input 42 for an atmosphere pressure signal relating the pressure in the surrounding atmosphere. An input 43 is designated to receive a drive signal 34 from the controller 11, 12, 13 which is in charge.

As further safety measure an additional input 44 may be provided to receive a pressure differential signal 40, indicating the pressure differential between the cabin F and the surrounding atmosphere. The outflow valve 14 further comprises an input-output 45 to exchange signals with the bus 22 as indicated with arrow 39. The inputs 43, 44 and the input-output 45 may in practice be designed as a single component, e.g. a connector.

All inputs 41, 42, 43, 44 and the input-output 45 are arranged in or connected to a logic unit 35, 36, 37. In the embodiment according to FIG. 4, the outflow valve 14 is provided with a single logic unit for actuating both drive units 25, 26 as schematically indicated with arrows 38. Both drive units 25, 26 are adapted to drive a schematically shown actuator 46 regulating airflow in the cabin F or out of the cabin F.

The embodiment according to FIG. 5 shows an outflow valve 14 with two logic units 36, 37. Each logic unit 36, 37 is associated to one drive unit 25, 26 for actuating the actuator 46. To provide full redundancy, each logic 36, 37 is provided with inputs 41, 42, 43 and the input-output 45. As additional safety measure, an input 44 for receiving the pressure differential signal 40 may be provided.

FIGS. 6 and 7 schematically show different embodiments for communication and signal processing. In the embodiment of FIG. 6, the actual pressure signal 32 from sensor 18 and the atmosphere pressure signal 33 from sensor 28 are communicated to the bus 22 and by the bus 22 to controller 11. The controller 11 calculates a drive signal 34 based on the actual pressure signal 32, the atmosphere signal 33 and additional parameters such as height above ground, estimated flight time, etc. Said drive signal 34 is communicated to the bus 22, too.

All signals 32, 33, 34 are transmitted to the logic unit 35 of the outflow valve 14, 15,16, 17. Said logic unit compares the drive signal 34 to the actual pressure signal 32 and the atmosphere pressure signal 33. If that comparison shows that the drive signal 34 is not faulty, the logic unit 35 actuates the associated drive units 25,26. If, however, said comparison shows that the drive signal 34 may be inaccurate said information is communicated back to the bus 22 as schematically shown at 47 and to the other controllers 12, 13. Signals 34 from the controller 11 are then ignored and one of the remaining controllers 12, 13 takes control.

Additionally or as alternative the other controllers 12, 13 may permanently receive the actual pressure signal 32 and the atmosphere pressure signal 33 or the differential pressure signal 40. All three controllers 11, 12, 13 are then working in parallel. An arbitration logic (not shown) decides which controller 11, 12, 13 is in charge. Only the drive signals 34 of said controller are evaluated by the logic unit 35. It goes without saying that the signal 32, 33 from the remaining sensors 19, 20, 29, 30 are communicated to the bus 22 and the controllers 11, 12, 13 for evaluation, too. If one sensor is defective its output signal 32, 33 is regarded as faulty and no longer considered.

FIG. 7 shows communication and signal processing with an outflow valve comprising two logic units 36, 37. Signals 32, 33, 34 are communicated by the bus 22 to both logic units 36, 37. Said two logic units 36, 37 communicate either via the bus 22 as schematically shown at arrow 39 or, as alternative, via the channels 27. Each logic unit 36, 37 monitors the position of its associated drive unit 25, 26. Said position is sent back to the bus 22 and to the other logic units 35, 36, 37 and the controllers 11, 12, 13 as shown at 39. If a drive unit position is found inaccurate, the power supply for said drive unit 24 is switched off. The drive units 25, 26 may be designed in such that they are inactive as soon as they no longer receive an input signal. With said design it will be sufficient to switch off the power supply for the associated logic unit 36, 37. The positions of the remaining drive units 25, 26 are adjusted in order to compensate said faulty position.

According to another embodiment, the outflow valves 14, 15, 16, 17 communicate with each other and determine a faulty drive unit position without involving the controllers 11, 12, 13. Communication is effected by means of the bus 22. By comparing the actual positions of all drive units 25, 26, a faulty position can readily be ascertained.

The invention provides a cabin pressure control system 10 which allows effective pressure control by communication of all components of the cabin pressure control system 10 with each other. The previously required safety valves E may be completely eliminated leading to a reduced weight. Due to the information exchange and communication between the components, redundancy of the cabin pressure control system can in accordance with the invention is significantly increased. Even if one or several components fail, it is still possible to maintain a highly sophisticated cabin pressure control. Should all controllers 11, 12, 13 fail, a safety function is provided based on the logic units 35, 36, 37 of the outflow valve 14, 15, 16, 17. Similarly, failure of one sensor 18, 19, 20, 28, 29, 30 can easily be compensated. The pressure differential between actual cabin pressure and the pressure of the surrounding atmosphere will reliably be kept between a predetermined upper and lower level.

What is claimed is:

1. A cabin pressure control system for a cabin surrounded by an ambient atmosphere comprising:
   at least one pressure sensor measuring actual pressure inside a cabin and generating an actual pressure signal;
   at least one controller connected to the at least one pressure sensor, the controller calculating a drive signal based on the actual pressure and an ambient pressure of an atmosphere surrounding the cabin or a pressure differential between the actual pressure and the ambient pressure; and
   at least one outflow valve connected to the at least one controller and the at least one pressure sensor and receiving the drive signal and the actual pressure signal, the outflow valve controlling the pressure differential.

2. A cabin pressure control system for a cabin surrounded by an ambient atmosphere comprising:
   at least one pressure sensor measuring actual pressure inside a cabin and generating an actual pressure signal;
   at least one additional sensor measuring an ambient pressure of an atmosphere surrounding the cabin and generating an ambient pressure signal;
   at least one controller connected to the at least one pressure sensor and to the at least one additional sensor, the controller calculating a drive signal based on the actual pressure and the ambient pressure of an atmosphere surrounding tho cabin or a pressure differential between the actual pressure and the ambient pressure;
   at least one outflow valve connected to the at least one controller and the at least one pressure sensor and receiving the drive signal and the actual pressure signal, the outflow valve controlling the pressure differential; and
   a data exchange line connected to the at least one pressure sensor, the at least one additional sensor, the at least one controller, and the at least one outflow valve.

3. The cabin pressure control system of claim 2 comprising:
   a plurality of controllers;
   a plurality of cabin pressure sensors;
   a plurality of outflow valves; and
   a common data exchange line connected to the controllers, sensors, and outflow valves.

4. The cabin pressure control system of claim 2 in which the data exchange line comprises a duplex bus.

5. The cabin pressure control system of claim 2 in which the data exchange line comprises a triple redundant bus.

6. The cabin pressure control system of claim 2 comprising a control board connected to the data exchange line for receiving instruction input from an operator and providing information output to an operator.

7. A method of controlling an actual pressure inside a cabin surrounded by an ambient atmosphere comprising:
   measuring an actual pressure inside the cabin and generating an actual pressure signal;
   measuring an ambient pressure of an atmosphere surrounding the cabin and generating an ambient pressure signal;
   calculating or measuring a pressure differential between the actual pressure and the ambient pressure and generating a pressure differential signal;
   communicating the actual pressure signal and the ambient pressure signal, or the actual pressure signal and the pressure differential signal to a controller which calculates a drive signal for an outflow valve;
   communicating the actual pressure signal to the outflow valve; and
   using the drive signal and the actual pressure signal to control the outflow valve to maintain the pressure differential between a predetermined upper level and a predetermined lower level.

8. The method of claim 7 comprising communicating the ambient atmospheric pressure signal to the outflow valve.

9. The method of claim 7 comprising measuring the ambient pressure and the actual pressure a plurality of times, and calculating or measuring the pressure differential a plurality of times based on the plurality of measurements.

10. The method of claim 9 comprising generating a drive signal from each of the calculated or measured pressure differentials and comparing the drive signals to determine any inaccurate calculations.

11. The method of claim 7 comprising measuring the positions of a plurality of drive units associated with a plurality of outflow valves and comparing the measurements to determine any inaccurate positions.

12. The method of claim 11 comprising deactivating an outflow valve in response to determining that the drive unit associated to said outflow valve has an inaccurate position.

13. An outflow valve for controlling a pressure differential between an actual pressure in a cabin and an ambient pressure of an atmosphere surrounding the cabin comprising:
   a valve;
   a drive connected to the valve;
   a first pressure signal input receiving a drive signal from a controller;
   a second pressure signal input receiving an actual pressure signal from a sensor; and a logic unit responsive to the drive signal and the actual pressure signal for actuating the drive.

14. The outflow valve of claim 13 comprising a second drive connected to the valve and the logic unit.

15. The outflow valve of claim 13 comprising a second logic unit and a second drive connected to the second logic unit and the valve.

16. The outflow valve of claim 13 comprising a third pressure signal input receiving an ambient pressure signal or the drive signal.

17. The outflow valve of claim 13 in which the first pressure signal input and the second pressure signal input comprise a common data exchange line input/output.

18. The outflow valve of claim 16 in which the first pressure signal input, the second pressure signal input and the third pressure signal input comprise a common data exchange line input/output.

19. A cabin pressure control system for a cabin surrounded by an ambient atmosphere comprising:

a plurality of pressure sensors measuring actual pressure inside a cabin and each sensor generating an actual pressure signal;

a plurality of controllers connected to the pressure sensors, the controllers each calculating a drive signal based on the actual pressure and an ambient pressure of an atmosphere surrounding the cabin or a pressure differential between the actual pressure and the ambient pressure;

a plurality of outflow valves connected to the controllers and the pressure sensors and receiving the drive signal and the actual pressure signal, the outflow valves controlling the pressure differential;

a common data exchange line connected to the controllers, sensors and outflow valves, and at least one additional sensor connected to the data exchange line for measuring the ambient pressure.

* * * * *